US008536437B2

(12) United States Patent  
Katsuta

(10) Patent No.: US 8,536,437 B2  
(45) Date of Patent: Sep. 17, 2013

(54) MUSICAL SCORE PLAYING DEVICE AND MUSICAL SCORE PLAYING PROGRAM

(75) Inventor: Masanori Katsuta, Hamamatsu (JP)

(73) Assignee: Kabushiki Kaisha Kawai Gakki Seisakusho, Hamamatsu-shi (JP)

( * ) Notice: Subject to any disclaimer, the term of this patent is extended or adjusted under 35 U.S.C. 154(b) by 0 days.

(21) Appl. No.: 13/433,224

(22) Filed: Mar. 28, 2012

(65) Prior Publication Data

US 2012/0247305 A1  Oct. 4, 2012

(30) Foreign Application Priority Data

Mar. 31, 2011  (JP) ................................ 2011-079292

(51) Int. Cl.
*G09B 15/02* (2006.01)

(52) U.S. Cl.
USPC ....................................... 84/477 R

(58) Field of Classification Search
USPC ....................................... 84/477 R
See application file for complete search history.

(56) References Cited

U.S. PATENT DOCUMENTS

| | | | | | |
|---|---|---|---|---|---|
| 3,460,425 | A | * | 8/1969 | Kiepe | 84/470 R |
| 3,562,394 | A | * | 2/1971 | Kiepe | 84/678 |
| 4,288,537 | A | * | 9/1981 | Knetzger | 434/169 |
| 6,143,972 | A | * | 11/2000 | Ladyjonsky | 84/615 |
| 7,019,204 | B2 | * | 3/2006 | Terada | 84/601 |
| 7,064,261 | B2 | * | 6/2006 | Shao | 84/477 R |
| 7,074,999 | B2 | * | 7/2006 | Sitrick et al. | 84/477 R |
| 7,098,392 | B2 | * | 8/2006 | Sitrick et al. | 84/477 R |
| 7,906,720 | B2 | * | 3/2011 | Delorme | 84/477 R |
| 2012/0174736 | A1 | * | 7/2012 | Wang et al. | 84/622 |
| 2012/0227571 | A1 | * | 9/2012 | Sasaki | 84/477 R |
| 2012/0247305 | A1 | * | 10/2012 | Katsuta | 84/477 R |

FOREIGN PATENT DOCUMENTS

| | | | | |
|---|---|---|---|---|
| GB | 2334137 | A | * | 8/1999 |
| JP | 2003-242438 | | | 8/2003 |
| JP | 3980888 | | | 7/2007 |
| JP | 2012103320 | A | * | 5/2012 |

* cited by examiner

*Primary Examiner* — David Warren
*Assistant Examiner* — Robert W Horn
(74) *Attorney, Agent, or Firm* — Christie, Parker & Hale, LLP

(57) ABSTRACT

The musical score playing device includes a display unit 3 made up of a touch panel, a musical score image source selecting unit 10, a musical symbol detecting unit 14 detecting at least a note position and pitch information from a musical score image source, a display device 17 displaying the selected musical score image and a playing pointer 5 on the display unit 3, a touch position detecting unit 23 detecting a touch operation position on the display unit 3, a moving means moving a position of the playing pointer 5 in correspondence to the touch operation position, and a musical sound preparing unit 31 emitting a musical sound of a pitch of a note corresponding to the playing pointer position at a timing that is in accordance with the movement of the playing pointer.

10 Claims, 3 Drawing Sheets

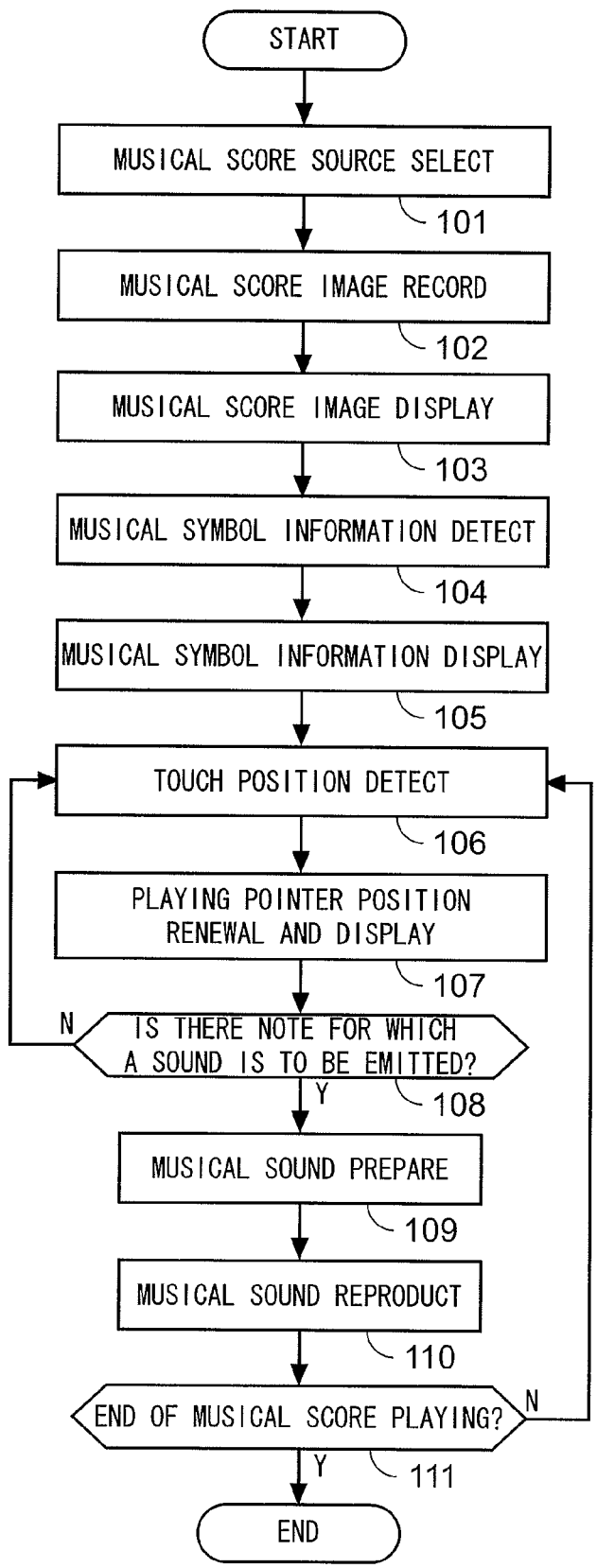

MUSICAL SCORE PLAYING DEVICE AND MUSICAL SCORE PLAYING PROGRAM

CROSS-REFERENCE TO RELATED APPLICATION

This application claims priority to and the benefit of Japanese Patent Application No. 2011-079292, filed in the Japanese Patent Office on Mar. 31, 2011, the entire contents of which are incorporated herein by reference.

TECHNICAL FIELD

The present invention relates to a musical score playing art of playing music from musical information of an electronically captured musical score and particularly relates to a musical score playing device and a musical score playing program that makes possible music playing of a high degree of freedom in reproducing musical sounds from musical information.

BACKGROUND ART

Electronic musical instruments that display playing data in musical score form on a touch panel have been proposed since priorly. As disclosed, for example, in Patent Literature 1, such an electronic musical instrument includes a memory that stores playing information including sound emission timings and pitch information, displays a musical score based on the playing information stored in the memory, and detects an operation position with respect to the display via a touch panel.

A musical sound generating unit generates a musical sound of a musical score symbol displayed at a position in the musical score displayed on the display screen corresponding to the operation position of the touch panel to enable easy recognition of a relationship between the symbol on the musical score and the musical sound.

CITATION LIST

Patent Literature

Patent Literature 1: Japanese Patent No. 3980888

SUMMARY OF INVENTION

Technical Problem

However, with the electronic musical instrument described above, there is an issue that the playing information including the sound emission timings and the pitch information must be stored in advance in the memory and a musical score cannot be played freely.

Also, although with respect to the musical score displayed on the display screen, automatic playing of playing information, corresponding to a region sandwiched by a touch start position of touch by a finger, etc., and a touch end position at which the touch is ended after moving the touch position continuously after the start of touch, is performed, the playing is performed automatically at the timing of sound emission that is in accordance with the playing information stored in advance in the memory, and there is thus an issue that the playing cannot be changed in accordance with a manner of touching and movements by a user cannot be reflected in the playing.

Meanwhile, with a printed musical score, it is difficult for a general person without any special musical training to look at the musical score and imagine a melody or pitch, and presence of a tool that enables a melody or musical interval to be checked easily is thus desired.

The present invention has been made in view of the above circumstances and an object thereof is to provide a musical score playing device and a musical score playing program, which, in generating musical sounds when a musical score displayed on a display screen is touched by a finger, etc., is capable of reproducing a melody or musical interval in a manner such that timing and position of the touch are reflected in musical sound preparation.

Solution to Problem

To achieve the above object, the present invention (first aspect) provides a musical score playing device that includes a display unit made up of a touch panel, a musical score image source selecting means (musical score source selecting unit) selecting a musical score image source to be displayed on the display unit, a musical information detecting means (musical symbol detecting unit) detecting at least a note position and pitch information from the musical score image source, an image display means (display device) displaying the selected musical score image and a playing pointer on the display unit, a touch position detecting means (touch position detecting unit) detecting a touch operation position on the display unit, a moving means moving a position of the playing pointer in correspondence to the touch operation position, and a sound emitting means (musical sound generating unit) emitting a musical sound of a pitch of a note corresponding to the playing pointer position at a sound emission timing that is in accordance with the movement of the playing pointer.

The second aspect of the invention is the musical score playing device according to the first aspect, wherein the sound emission timing is a timing at which the playing pointer passes through the position of the note.

The third aspect of the invention is the musical score playing device according to the first aspect, wherein the sound emission timing is a timing at which the playing pointer moves to the position of the note.

The fourth aspect of the invention is the musical score playing device according to the third aspect, wherein each time a touch-on operation is performed on the touch panel, the moving means moves the playing pointer position to the position of a note to be played next.

The fifth aspect of the invention is the musical score playing device according to any one of the first to third aspects, wherein the playing pointer is arranged as a straight line perpendicular to the staff.

The sixth aspect of the invention is the musical score playing device according to the first aspect wherein, when a plurality of touch operation positions are present, the touch position detecting means is capable of detecting each of the touch operation positions, and the sound emitting means simultaneously emits musical sounds of a plurality of notes sandwiched between the touch operation positions at a timing corresponding to the movement of the playing pointer.

The seventh aspect of the invention is a musical score playing program for a musical score playing device including a display unit made up of a touch panel, the program making a computer execute, a function of displaying a musical score image source on the display unit, a function of detecting at least a note position and pitch information from the musical score image source, a function of displaying a playing pointer with respect to the musical score image, a function of detecting a touch operation position on the display unit, a function of moving a position of the playing pointer in correspondence to the touch operation position, and a function of emitting a musical sound of a pitch of a note corresponding to the playing pointer position at a timing at which the playing pointer passes through the position of the note.

The eighth aspect of the invention is a musical score playing program for a musical score playing device including a display unit made up of a touch panel, the program making a computer execute, a function of displaying a musical score image source on the display unit, a function of detecting at least a note position and pitch information from the musical score image source, a function of displaying a playing pointer with respect to the musical score image, a function of detecting a touch operation position on the display unit, a function of moving a position of the playing pointer in correspondence to the touch operation position, and a function of emitting a musical sound of a pitch of a note corresponding to the playing pointer position at a timing at which the playing pointer moves to the position of the note.

Advantageous Effects of Invention

By the present invention (first aspect), the position of the playing pointer moves in correspondence to the touch operation position and the sound emitting means emits the musical sound of the pitch of the note corresponding to the playing pointer position in accordance with the timing of movement of the playing pointer, and thus a change can be applied to the musical sound emission timing by making the playing pointer move in accordance with a change of the touch operation position to enable playing that can be mediated by an operator.

By the second and seventh aspects of the invention, the musical sound of the pitch of a note can be emitted at a timing at which the playing pointer passes through the position of the note. The operator can thus control the musical sound emission timing at will by moving the playing pointer in accordance with the touch operation (swipe playing).

By the third and eighth aspects of the invention, the musical sound of the pitch of a note can be emitted at a timing at which the playing pointer moves to the position of the note that is the destination of movement. The playing pointer can thus be moved in accordance with contacting of the touch operation position and a change can thereby be applied to the musical sound emission timing.

By the fourth aspect of the invention, each time a touch-on operation is performed on the touch panel, the moving means can move the playing pointer position to the position of a note to be played next, and the operator can freely control the sound emission timing by tapping at his/her own rhythm (tap playing).

By the fifth aspect of the invention, the playing pointer is arranged as a straight line perpendicular to a staff and thus the playing pointer can be moved onto a note or notes (single or plural) and the note or notes corresponding to the musical sound that is being emitted can be recognized easily.

By the sixth aspect of the invention, the multi-touch operation, with which a plurality of touch operation positions are detected, is enabled, and by the musical sounds of the plurality of notes sandwiched between the touch operation positions being emitted simultaneously at the timing corresponding to the movement of the playing pointer, simultaneous playing of a plurality of parts in the musical score can be performed.

BRIEF DESCRIPTION OF THE DRAWINGS

FIG. 3 is a flowchart of a processing procedure for musical sound reproduction by the musical score playing program according to the present invention.

DESCRIPTION OF EMBODIMENTS

An example of an embodiment of a musical score playing device according to the present invention shall now be described with reference to the drawings.

Figure 1:
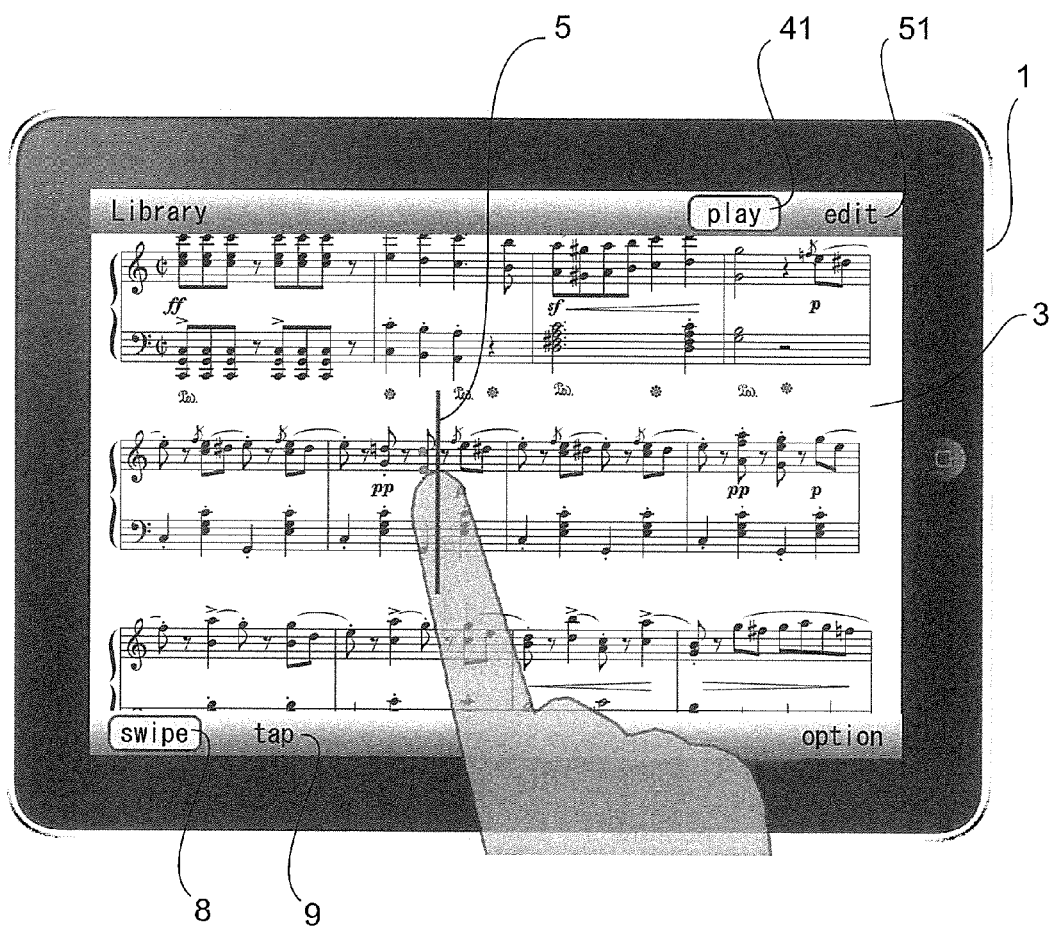
FIG. 1 is an explanatory plan view of a case where a musical score playing device is arranged by storing a musical score playing program according to an embodiment of the present invention in a mobile terminal.

The musical score playing device according to the present invention is arranged in a tablet type mobile terminal 1 such as shown in FIG. 1. The mobile terminal 1 includes a CPU, a storage unit, such as a ROM, RAM, or hard disk, etc., an LCD or other display unit 3, an input unit set as a touch panel inside the display unit 3, and a sound source and a speaker unit for reproducing musical sounds. The mobile terminal 1 is arranged to function as the musical score playing device by a musical score playing program being stored in advance in the storage unit, for example, via the internet.

The musical score playing device is arranged so that a menu screen for selecting a musical score image source is displayed on the display unit 3 upon startup of the mobile terminal 1.

After selection of the musical score image source, an image is displayed on the display unit 3 upon being selected from among image pickup data from a camera, images downloaded from the internet, and still images stored in advance in a photo library. Then by a playing pointer 5, displayed on the display unit 3, being moved with respect to the musical score image, a musical sound of a pitch of a note corresponding to the position of the playing pointer is emitted at a timing corresponding to the movement of the playing pointer (musical score playing).

FIG. 1 illustrates a case where a still image in a photo library has been selected as the musical score image source, and a play mode switch 41 and an edit mode switch 51 are displayed at an upper right portion of the display unit 3 and a swipe playing selecting unit 8 and a tap playing selecting unit 9 are displayed at a lower left portion.

The swipe playing selecting unit 8 and the tap playing selecting unit 9 are for selecting a method for moving the playing pointer 5 and detailed functions thereof shall be described later.

Figure 2:
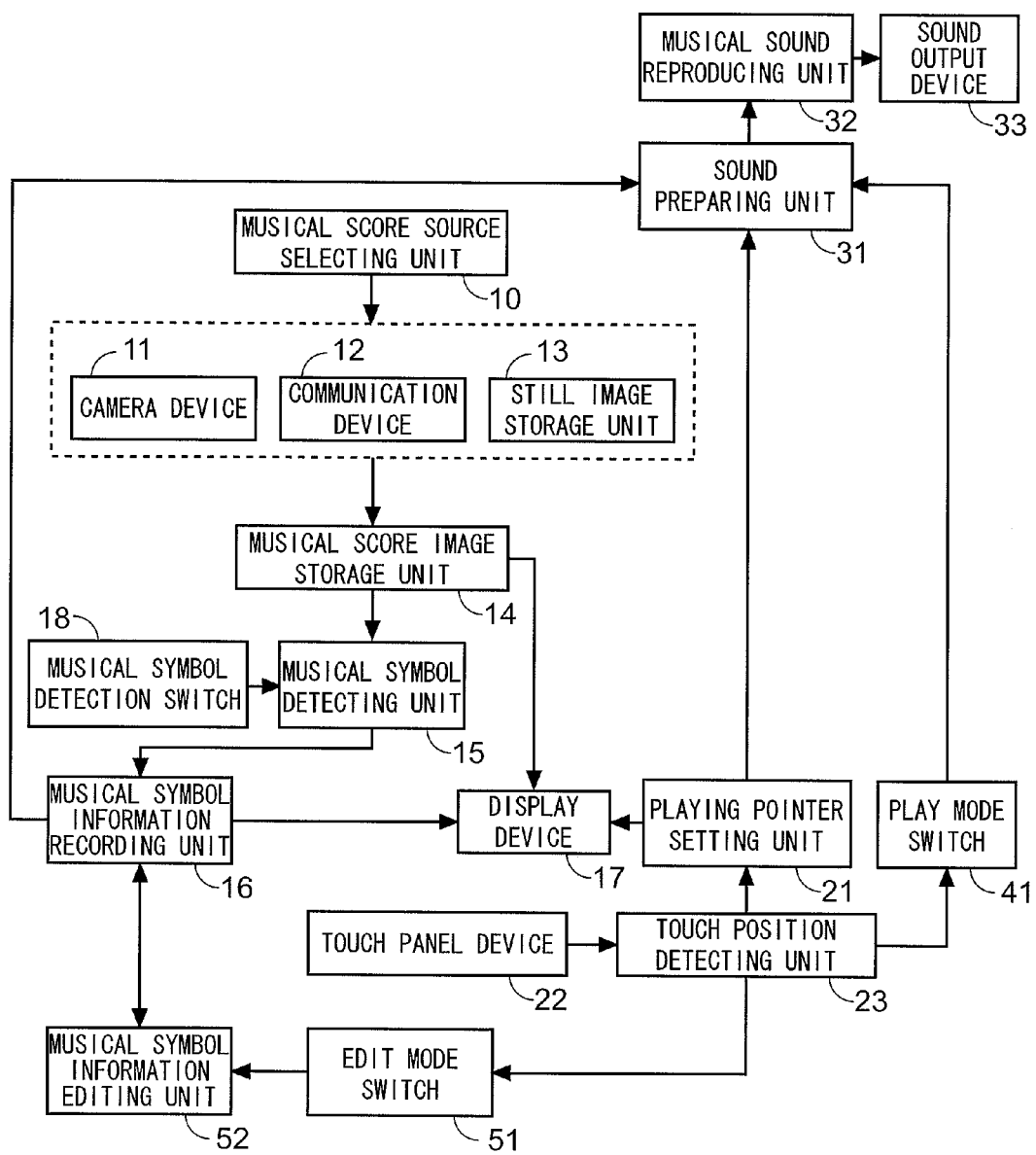
FIG. 2 is a block diagram of an arrangement of the musical score playing device according to the embodiment of the present invention.

As shown in FIG. 2, the musical score playing device includes a musical score source selecting unit (musical score image source selecting means) 10 for selecting the source of the musical score image displayed on the display unit 3, a musical score image storage unit 14 recording the musical score image, a musical symbol detecting unit (musical information detecting means) 15 detecting musical symbols (musical information) from the musical score image, a musical symbol information recording unit 16 recording the musical symbols of the musical score image, a display device (image display means) 17 displaying the musical information, and a musical symbol detection switch 18.

The musical score source selecting unit 10 selects the musical score image from among image pickup data taken by a camera device 11, musical scores (for example, PDF images) downloaded from a browser via a communication device 12, and musical scores stored in the form of a library in advance in a still image storage unit 13 of the mobile terminal 1. The musical score image selected as the musical score source is recorded in the musical score image storage unit 14.

In a case where image pickup data of the camera device 11 are selected as a musical score manuscript by the musical score source selecting unit 10, a musical score image is taken by the camera device 11 built into the mobile terminal 1 and the image pickup data are captured as musical score image data (still image) into the musical score image storage unit 14.

The musical score image data selected by the musical score source selecting unit 10 and recorded in the musical score image storage unit 14 are output to the musical symbol detecting unit 15, and staffs, notes, clefs, and other musical symbol information are detected from the musical score image data at the musical symbol detecting unit 15.

In the detection of a staff from the musical score image data, detection by a known method that has been put into practice since priorly is performed, and for example, as described in Japanese Published Unexamined Patent Application No. 2003-242438, a rectangle presumed to contain a staff is detected based on a cumulative histogram determined by summing a number of black pixels in a horizontal direction in the input musical score image data, and the staff is detected from the musical score image data inside the rectangle.

In the detection of musical symbols from the musical score image data, detection by a known method that has been put into practice since priorly is performed, and in regard to notes and other symbol information, at least X-axis (horizontal direction) and Y-axis (vertical direction) positions with respect to the staff are detected from the input musical score image data.

The musical symbol information recording unit 16 records the musical symbol information detected from the musical score image data. The musical symbol information may include note value data of notes.

The display device 17 performs display regarding the musical symbol information including the detected staffs, notes, etc., on the display unit 3 of the mobile terminal 1. In the mobile terminal 1, in a case where a musical score stored in the still image storage unit 13 (library) is selected as the musical score image source, the screen display will be as shown in FIG. 1.

The musical symbol detection switch 18 instructs the musical symbol detecting unit 15 to detect the musical symbol information from the musical score image storage unit 14 and output the musical symbol information to the musical symbol information recording unit 16.

The detection instruction is issued by the musical symbol detection switch 18 in accordance with an operation by a user (for example, an operation of touching a detection execution button displayed on the display unit 3, etc., of the mobile terminal 1).

The detected musical symbol information are displayed on the display unit 3. It is also effective for marks of some form that correspond to the musical symbol information to be displayed overlappingly on the musical score source to enable the musical score, which is the detection source, to be compared readily with the detection result.

The playing pointer 5 that moves to a touch position (touch operation position) touched by a finger of the user is displayed on the display unit 3 of the mobile terminal 1. The playing pointer 5 indicates a playing position when musical score playing is performed and is arranged as a vertical line perpendicular to staffs and crossing the staffs as shown in FIG. 1.

For display of the playing pointer 5 on the display unit 3, the musical score playing device includes a playing pointer setting unit 21, a touch panel device 22, and a touch position detecting unit (touch position detecting means) 23. The playing pointer setting unit 21 includes a moving means that moves the playing pointer 5 in accordance with the touch operation position detected by the touch position detecting unit 23.

Also, the playing pointer 5 displayed on the display unit 3 suffices if it enables the playing position to be checked and for example, in place of the vertical line that crosses the staff, the pointer may be arranged as a finger mark or arrow, etc., that is movable along the staff and below the staff.

That is, with the display device 17, the playing pointer is displayed at the position set by the playing pointer setting unit 21 with respect to the musical symbol information displayed. The entirety of the display unit 3 makes up the touch panel device 22 and when the user of the mobile terminal 1 touches the display unit 3 with a finger, the touched position is detected by the touch position detecting unit 23, the playing pointer setting unit 21 recognizes the touched position, displays the position of the playing pointer on the display unit 3, and outputs the position to a musical sound reproducing means that reproduces a musical sound based on a timing corresponding to the movement of the playing pointer and a musical symbol information (note) corresponding to the position of the playing pointer.

The touch position detecting unit 23 may be arranged to enable a multi-touch operation by being enabled to detect each of a plurality of touch positions (touch operation positions) when these are present on the touch panel device 22.

The touch position detecting unit 23 also detects a selection operation between the play mode switch 41 and the edit mode switch 51 displayed on the display unit 3.

The musical sound reproducing means is arranged with a musical sound preparing unit 31 that prepares sounds based on musical information (clefs, key signatures, notes, accidental notations, ties, etc.) of the musical symbol information, a musical sound reproducing unit 32 that reproduces the sounds, and a speaker unit or other sound output device 33. The data of the musical symbol information stored in the musical symbol information recording unit 16 upon detection of the staffs and other musical symbols are input into the musical sound preparing unit 31.

Also, when a play mode is selected by the play mode switch 41, the musical sound preparing unit 31 receives a signal from the touch position detecting unit 23 and prepares a musical sound based on the musical symbol information input into the musical sound preparing unit 31, the playing pointer position set by the playing pointer setting unit 21, and the timing of movement.

A relationship between the playing pointer 5 and a note for which musical sound reproduction is performed shall now be described.

In a case where the swipe playing selecting unit 8 is selected on the display unit 3, musical sounds of pitches of notes corresponding to positions through which the playing pointer passes are emitted at a timing corresponding to the movement of the playing pointer 5 with respect to the musical score image. In a case where the note information includes information on note value, a length of the sound is reflected in the reproduction as well.

Thus, by moving the playing pointer 5 in a manner of swiping across the musical score image, playing can be performed with musical sounds being emitted continuously in accordance with the speed of swiping. Also, by swiping the same position repeatedly, the pitches of notes can be checked in a manner of a tuning practice of a chorus.

Also, swiping can be performed freely along the musical score so that reverse reproduction can be performed by swiping across the musical score from right to left, a specific range can be repeated any number of times, various parts of the musical score can be swiped in an intermittent manner, or swiping can be performed swiftly along the musical score in a DJ-scratch-like manner to perform improvisational playing.

In a case where the tap playing selecting unit 9 is selected on the display unit 3, a musical sound of a pitch of a note corresponding to a position of destination of movement of the playing pointer 5 is emitted at a timing corresponding to the movement of the playing pointer 5 with respect to the musical score image. For example, with a first tap immediately after selection of tap playing, the playing pointer is moved to a note position nearest the tap position and the musical sound of the note (or chord) at the movement destination is emitted at the timing of movement. With a second tap, if the staff nearest the second tap position is the same as the staff to which the note that was sounded with the first tap belongs, the playing pointer is moved to the position of the next note within the staff and the musical sound of the note (or chord) at the movement destination is emitted at the timing of movement.

Oppositely, if the abovementioned staffs differ, the playing pointer is moved to the position of the note at the closest position to the touch position in the same manner as in the first tap and the musical sound of the note (or chord) at the movement destination is emitted at the timing of movement. Likewise with the third tap onward, the playing pointer is moved in accordance with the tap position and the musical sound of the note at the position of the movement destination is emitted at the timing of movement.

By thus moving the playing pointer in a tapping manner with respect to the musical score image, musical sounds can be emitted in accordance with the rhythm of tapping, and the operator can perform tap playing while controlling the note value and tempo at will by the tapping operation.

Also, the musical score playing device includes the edit mode switch 51 and a musical symbol information editing unit 52 for editing the musical symbol information displayed on the display unit 3.

That is, when the edit mode is selected by the edit mode switch 51, modification of positions of pitches of notes in the musical symbol information displayed on the display unit 3, deletion of a note in a case of erroneous recognition of the note (case where a note that is not present in the musical score image is displayed), addition of a note in a case where the note was not recognized (case where a note in the musical score image is not displayed), etc., are performed. The modification is performed, for example, by such methods as designating a note to be modified and moving it to a desired position or changing an accidental notation added thereto or deleting the note itself, etc. Musical symbols (clefs, key signatures, dynamic marks, tempo marks, etc.) besides notes can likewise be modified. Information on the modification of the musical symbols at the musical symbol information editing unit 52 is output to the musical symbol information recording unit 16 and displayed on the display unit 3 of the display device 17 upon being rewritten to the edited musical symbol information.

A procedure by which a musical score image is played using the musical score playing device (mobile terminal 1) shall now be described mainly with reference to the flowchart of FIG. 3.

First, a musical score image from among image pickup data taken by the camera device, musical scores (for example, PDF images) downloaded from a browser via the communication device 12, and musical scores stored in the form of a library in advance in the still image storage unit 13 is selected as the musical score source in the menu screen of the musical score playing device (mobile terminal 1) (step 101).

The selected musical score source is recorded as a musical score image (step 102) and displayed as the musical score image on the display unit 3 (step 103).

In the case where the musical score image is to be read by the camera device 11, a task of reading a musical score image of an entirety or a portion of a musical score image written on a single sheet (one page) of a musical score manuscript is performed. That is, the camera device 11 built into the mobile terminal 1 is directed toward the musical score manuscript and a still image in which the musical score image is imaged is captured and stored as the musical score source by a user operation of pressing a shutter button displayed in the display unit 3.

Musical symbol detection, including staff detection and detection of a treble clef, bass clef, and other clefs, notes, key signatures, etc., is then performed on the musical score image of the selected musical score source (step 104) and display of the musical symbol information, including information on staffs, notes, clefs, etc., on the display unit 3 is performed (step 105). This is done because by detecting the staffs, bar lines, clefs, key signatures, notes, etc., the pitches of the notes displayed on the staffs are established, thereby enabling reproduction thereof as absolute sounds.

The task of capturing the musical score image into the musical score playing device is completed by the above operations.

A playing process performed in regard to the captured musical score image shall now be described.

When in a playing screen of the display unit 3 with which the play mode has been selected (FIG. 1), a staff portion to be played is touched by a user's finger, a position in the stored musical symbol information is detected as the touch position (step 106).

Based on the touch position, the playing pointer 5 is moved to the touch position and displayed on the display unit 3 (step 107). Whether or not a note for which a sound is to be emitted is present at the playing pointer position is judged (step 108) and if a note is not present, the touch position detection of step 106 is repeated and the playing pointer position renewal and display are performed (step 107). The judgment of whether or not a note for which a sound is to be emitted is present at the touch position differs according to the play mode selected in the display unit 3. In a case where swipe playing is selected as the play mode, the note (or chord) that was passed through during movement of the playing pointer is subject to sound emission. In a case where tap playing is selected as the play mode, the note (or chord) at the movement destination of the playing pointer is subject to sound emission.

Although the selection of the play mode is performed, for example, by touching the swipe playing button or the tap playing button of the display unit 3, another method may be employed instead.

For example, a case where a finger is slid from a state of touching the touch panel for a predetermined time or more may automatically be handled as swipe playing, and a case where the touching time is an extremely short time or a change between a touch-on position and a touch-off position is extremely small may automatically be handled as tap playing. Here, buttons for switching between play modes do not have to be disposed on the display unit 3.

When the above process is performed repeatedly and a note for which a sound is to be emitted is present at the position of the playing pointer (step 108), a musical sound is generated based on the information of the note (step 109), musical sound reproduction is performed based on the musical sound (step 110), and this process is performed repeatedly until an end of musical score playing is selected (step 111). In a case where a plurality of notes to be sounded are present at the same position of a staff, musical sound reproduction of the notes as a chord is performed.

Also, in a case where a plurality of touch locations are present, a multi-touch operation, with which the respective positions can be detected, may be employed and simultaneous playing of a plurality of parts may be performed by simultaneously emitting the sounds of the notes of a plurality of staffs sandwiched between the touch positions at the timing of movement of the playing pointer.

By the musical score playing device described above, musical sounds are reproduced from the musical symbol information read from a musical score image captured into the mobile terminal 1 to enable a melody, chord, etc., indicated in the musical score to be easily checked immediately by a simple operation.

The invention claimed is:

1. A musical score playing device comprising:
   a display unit comprising of a touch panel;
   a musical score image source selecting means for selecting a musical score image source to be displayed on the display unit;
   a musical information detecting means for detecting at least a note position and pitch information from the musical score image source;
   an image display means for displaying the selected musical score image and a playing pointer on the display unit;
   a touch position detecting means for detecting a touch operation position on the display unit;
   a moving means for moving a position of the playing pointer in correspondence to the touch operation position; and
   a sound emitting means for emitting a musical sound of a pitch of a note corresponding to the playing pointer position at a sound emission timing that is in accordance with the movement of the playing pointer.

2. The musical score playing device according to claim 1, wherein the sound emission timing is a timing at which the playing pointer passes through the position of the note.

3. The musical score playing device according to claim 1, wherein the sound emission timing is a timing at which the playing pointer moves to the position of the note.

4. The musical score playing device according to claim 3, wherein each time a touch-on operation is performed on the touch panel, the moving means moves the playing pointer position to the position of a note to be played next.

5. The musical score playing device according to claim 1, wherein the playing pointer is arranged as a straight line perpendicular to the staff.

6. The musical score playing device according to claim 2, wherein the playing pointer is arranged as a straight line perpendicular to the staff.

7. The musical score playing device according to claim 3, wherein the playing pointer is arranged as a straight line perpendicular to the staff.

8. The musical score playing device according to claim 1, wherein, when a plurality of touch operation positions are present, the touch position detecting means is capable of detecting each of the touch operation positions, and
   the sound emitting means simultaneously emits musical sounds of a plurality of notes sandwiched between the touch operation positions at a timing corresponding to the movement of the playing pointer.

9. A tangible storage medium having a musical score playing program for a musical score playing device including a display unit made up of a touch panel, the program including executable code to cause the musical score playing device to perform:
   displaying a musical score image source on the display unit,
   detecting at least a note position and pitch information from the musical score image source,
   displaying a playing pointer with respect to the musical score image,
   detecting a touch operation position on the display unit,
   moving a position of the playing pointer in correspondence to the touch operation position, and
   emitting a musical sound of a pitch of a note corresponding to the playing pointer position at a timing at which the playing pointer passes through the position of the note.

10. A tangible storage medium having a musical score playing program for a musical score playing device including a display unit made up of a touch panel, the program including executable code to cause the musical score playing device to perform:
    displaying a musical score image source on the display unit,
    detecting at least a note position and pitch information from the musical score image source,
    displaying a playing pointer with respect to the musical score image,
    detecting a touch operation position on the display unit,
    moving a position of the playing pointer in correspondence to the touch operation position, and
    emitting a musical sound of a pitch of a note corresponding to the playing pointer position at a timing at which the playing pointer moves to the position of the note.

* * * * *